(No Model.)
C. P. ELIESON.
STORAGE BATTERY PLATE.
No. 519,602.          Patented May 8, 1894.
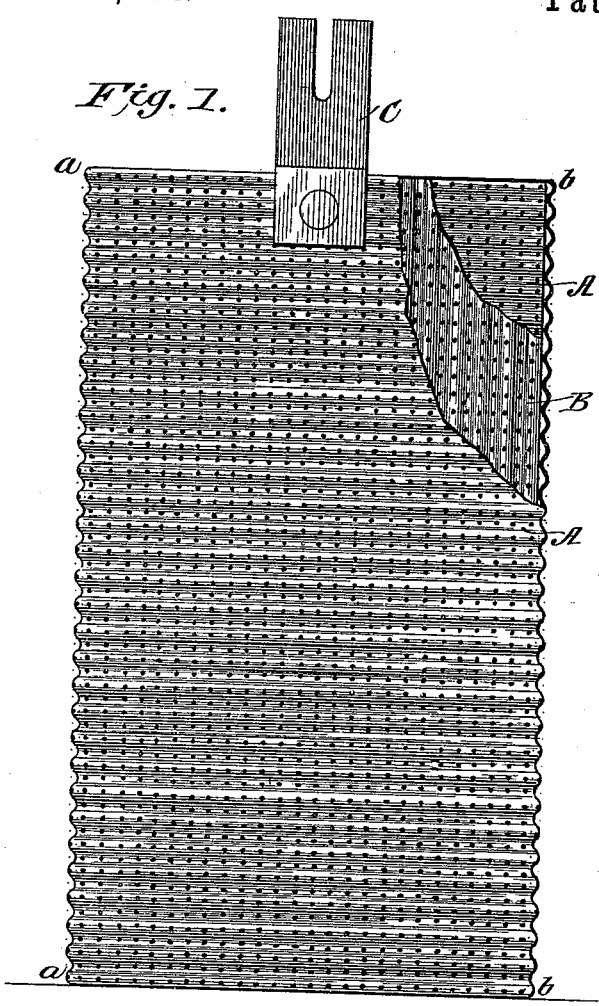
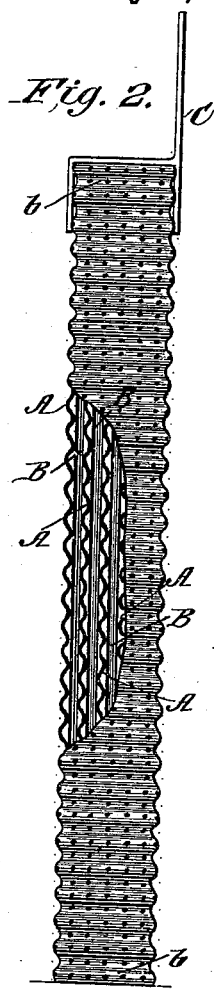
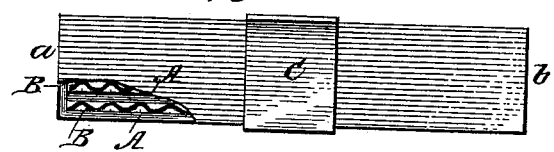
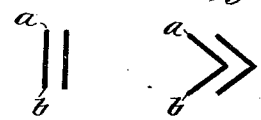 
 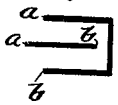
WITNESSES:
Fred G. Dieterich
Edw. W. Byrn
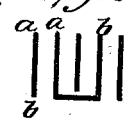 
INVENTOR
Chaimsonovitz P. Elieson.
BY Munn & Co
ATTORNEYS.
THE NATIONAL LITHOGRAPHING COMPANY,
WASHINGTON, D. C.

UNITED STATES PATENT OFFICE.

CHAIMSONOVITZ P. ELIESON, OF LONDON, ENGLAND, ASSIGNOR TO HIMSELF, AND FRANCISCO ALFREDO PELLAS, OF NICARAGUA, NICARAGUA.

STORAGE-BATTERY PLATE.

SPECIFICATION forming part of Letters Patent No. 519,602, dated May 8, 1894.

Application filed October 26, 1893. Serial No. 489,203. (No model.) Patented in Germany February 9, 1892, No. 71,132; in Switzerland November 5, 1892, No. 5,655, and in Belgium November 7, 1892, No. 102,011.

*To all whom it may concern:*

Be it known that I, CHAIMSONOVITZ PROSPER ELIESON, of London, England, have invented a new and useful Improvement in Storage-Battery Plates, (for which I have obtained patents in foreign countries as follows: Germany, No. 71,132, dated February 9, 1892; Switzerland, No. 5,655, dated November 5, 1892, and Belgium, No. 102,011, dated November 7, 1892,) of which the following is a specification.

Electrical accumulators or storage batteries as at present generally used have a number of plates which deteriorate so rapidly as to become comparatively useless in a short time, and this is especially the case with accumulators used for electric traction. The principal reasons of such short life are the buckling of the positive plates and their rapid disintegration chiefly owing to the gradual growth or expansion of the said plates and the molecular increase of the active material, and to the fact that such growth or enlargement is usually checked by the body or frame which holds the active material, whereby the plates in their forcible expansion will assume fanciful shapes or become warped, with the result that the said plates are nearer at some points than others whereby the uniformity of the internal construction is in a short time destroyed, as is also the uniformity of the internal resistance between the plates. In a patent heretofore granted me, No. 469,129, dated February 16, 1892, I have overcome these difficulties in accumulators having tubular electrodes by building up the electrodes of a series of juxtaposed corrugated and perforated metal tubes, the corrugations of each tube being at an angle to the corrugations of the next adjacent tube or tubes.

My present invention relates to plates, or non-tubular electrodes of the Planté type, and it consists in a storage battery plate built up of parallel layers of corrugated and perforated metal, the corrugations of one layer being at an angle to those of the adjacent layer so as to prevent nesting or coinciding, and preserve an even and constant groove space between and a fixed and permanent bracing of the layers in relation to each other, the said plates so built up having their corrugations parallel to the plane of the plate, and having also detached vertical terminal edges in contradistinction to curving around and running into themselves again to form a tube as in my patent referred to.

Figure 1 is a side view of a storage battery plate constructed in accordance with my invention, and having a portion of its layers torn away to show the alternating lay of the corrugations. Fig. 2 is an edge and Fig. 3 a top plan view, each having also a portion in section to show the relation of the layers from these different points of view. Figs. 4 to 9 are horizontal sections showing diagrammatically the different shapes of plates in cross section, and their arrangement when assembled in a cell.

Referring to Figs. 1, 2 and 3, A A A are a series of thin lead sheets corrugated horizontally, and B B B represent an alternating series of thin lead sheets which are corrugated vertically. These layers or sheets of lead lie in parallel contact with each other, and the corrugations of any one layer cross those of the next adjacent layer or layers. As shown they cross at right angles, but the angle is unimportant so long as they cross. In this relation the corrugation of the layers maintain the layers a permanent and uniform distance apart, by preventing the nesting or meshing of one corrugation into the groove of the next, and holds them in this relation through the varying conditions of charging and discharging the battery with a uniform groove space between. The corrugations of all the layers lie parallel with the plane of the plate, and all of said layers throughout their entire surfaces are pierced with a multitude of holes. These constitute an important part of my invention, for they furnish a passageway to the electrolytic fluid laterally through the layers, or at right angles to the plate, and provide the necessary conditions for the successful use of the plates in accordance with the Planté system. These holes it will be seen gives access laterally through the plate to all the groove spaces and surfaces of the corrugated layers throughout the plate. Expansion from molecular increase of the layers does not distort the plate, since said expansion is taken up by the bends of the corrugations, and the space between the layers in the shape of grooves crossing each other is maintained uniform, for the reason that the corrugations lie against each other, and are immovably held in this relation, thereby insuring uniformity of internal construction and resistance. To the top of each plate in solid electrical contact with all the layers, a metal strip C is fastened for connecting up the plates in the battery. As so far described these plates are flat planes which have at one edge a terminal vertical end $a\ a$, and at the other edge a terminal vertical end $b\ b$, i. e. the edges $a\ a$ and $b\ b$ constitute the ends of the plate measured horizontally in contradistinction to a tubular electrode which has no ends but turns into itself. These plates need not be flat planes, but may be any other shape in cross section so long as they have terminal vertical ends detached or separated from each other, and with perforated corrugations crossing each other but lying in the plane of the plate. When the plates are flat planes they are grouped as in Fig. 4. The plates may, however, be V-shaped in horizontal cross section as in Fig. 5, or they may be curved as in Fig. 6; or one may be flat and the other conforming to the three sides of a rectangle as in Figs. 7 and 8; or they may be both in the shape of the three sides of a rectangle, or the letter U, and alternated as shown in Fig. 9. In all cases, however, the plates are built up of metal layers corrugated and perforated, with the corrugations of the layers crossing each other, but all lying in the plane of the plate, the said plates having separated or terminal vertical ends $a\ a$ and $b\ b$.

In defining my invention with greater clearness I would state that I am aware of the patent to Paget, No. 393,573, dated November 27, 1888, in which a positive plate has been built up of narrow ribbons or strips of metal corrugated and with the corrugations of the alternate strips arranged crosswise to the others. In this case, however, the corrugations do not run parallel to the plane of the plate but at right angles to it, and furthermore the layers are not perforated. When the layers and their corrugations run parallel to the plane of the plate in broad sheets as in my invention, it will be seen that the perforations are a prime essential and are correlated to this arrangement of the layers, since without said perforations the electrolytic fluid could not gain access to the several layers in direction at right angles to the plate.

Having thus described my invention, what I claim as new, and desire to secure by Letters Patent, is—

A storage battery plate composed of sheets of corrugated metal arranged in parallel layers with the corrugations of the layers parallel to the plane of the plate and with the corrugations of one layer arranged at an angle to those of the next adjacent layers, said sheets being perforated throughout their entire surfaces with a multitude of holes to permit the passage of the electrolytic fluid through the same at right angles to the plane of the plate, and the said plates, so constructed, having separated vertical ends or edges $a$ and $b$ in contradistinction to a tubular form substantially as shown and described.

CHAIMSONOVITZ P. ELIESON.

Witnesses:
 WARREN B. HUTCHINSON,
 C. SEDGWICK.